UNITED STATES PATENT OFFICE.

ALBERT CARON, OF HAUS ELLENBACH, GERMANY, ASSIGNOR TO THE FARBENFABRIKEN OF ELBERFELD CO., OF NEW YORK.

CULTURE OF BACTERIA.

SPECIFICATION forming part of Letters Patent No. 679,600, dated July 30, 1901.

Application filed October 26, 1897. Serial No. 656,404. (No specimens.)

*To all whom it may concern:*

Be it known that I, ALBERT CARON, a subject of the Emperor of Germany, residing at Haus Ellenbach, near Bettenhausen, Germany, have invented a new and useful Improvement in the Culture of Bacteria, (for which I have already obtained Letters Patent in Germany, No. 105,205, dated January 25, 1898; in France, No. 264,866, and in Belgium, No. 126,887, both dated March 10, 1897,) of which the following is a clear and exact description.

Hitherto bacteria were cultivated either in liquid or solid culture media. If cultivated in liquid-culture media, the bacteria did not get air enough to develop to the highest possible degree, and if cultivated in solid-culture media they were not offered that surface which is necessary for rapid multiplication.

I have now found a process to cultivate bacteria on a very large scale, which enables me to apply them for practical purposes.

In order to carry out my process with the bacteria *Ellenbachensis alpha*, discovered by me and described in a simultaneous application, I prefer to use potatoes as a culture medium and proceed as follows:

Example 1: Peeled and cleaned potatoes are cooked by steam and pressed through a machine to which a sieve-bottom has been attached. The potato mass pressed through such a sieve assumes a granular condition which is exceedingly fit for cultivating bacteria on a large scale in a very small space. The granules are then inoculated with the *Bacillus ellenbachensis alpha* in the ordinary manner, using all the known precautions. Naturally one can also mix the crumbled matters with indifferent substances, no better results being, however, obtained by the last-named operation. The crumb-like (granular) structure of the culture medium does not only furnish the micro-organisms with a sufficient quantity of food, but also with the air necessary for developing and multiplying.

Example 2: Bread is saturated with broth, and the thus-obtained mixture is crumbled, (granulated.) The mass is put into suitable small sterilized tubes or vials and inoculated in the usual manner with the *Bacillus ellenbachensis alpha*. The tubes are placed in a so-called "culture-chamber," and after a short time the whole culture medium will be found to be thoroughly permeated with the bacteria, which by and by change into spores. In one tube of the kind generally used for bacteriological purposes, which was half filled with the above-described crumbs, (granules,) I could count fifty milliards of the *Bacillus ellenbachensis alpha*.

Of course one can employ other suitable culture media—such as agar-agar, gelatin, and the like—after mixing them with suitable substances, by means of which it is possible to obtain the culture media above referred to in a crumbled (granular) form. In this crumb-like (granular) culture medium all conditions for an extremely rapid multiplication are given, and it is possible to produce the same number of bacteria in one hundredth of the volume of the medium.

This new method of producing pure cultivations may be employed for all kinds of ground bacteria and for bacteria of the spore-bearing variety in general. It may also be advantageously applied to cultivations of the bacteria contained in the nodules on leguminous plants. In every instance the multiplication of the bacteria is extremely facilitated.

Having thus described my invention, what I claim as new, and desire to secure by Letters Patent, is—

1. The process of cultivating aerob bacteria which consists in first crumbling boiled potatoes; secondly, filling the granular medium thus obtained into sterilized receptacles; thirdly, inoculating it in the usual manner with pure cultivations of aerob bacteria, and fourthly, placing the thus-inoculated medium in a culture-chamber to develop, substantially as described.

2. The process of cultivating bacteria which consists in first crumbling boiled potatoes; secondly, filling the granular medium thus obtained into sterilized receptacles; thirdly, inoculating it in the usual manner with pure cultivations of the *Bacillus ellenbachensis alpha;* and fourthly, placing the thus-inoculated medium in a culture-chamber to develop, substantially as described.

3. As a new article of commerce, cooked potatoes in a granular condition, permeated by the *Bacillus ellenbachensis alpha*, and its spores.

In testimony whereof I have signed my name in the presence of two subscribing witnesses.

ALBERT CARON.

Witnesses:
GEORG